(12) United States Patent
Allen

(10) Patent No.: US 7,487,681 B1
(45) Date of Patent: Feb. 10, 2009

(54) PRESSURE SENSOR ADJUSTMENT USING BACKSIDE MASK

(75) Inventor: Henry V. Allen, Fremont, CA (US)

(73) Assignee: Silicon Microstructures Inc., Milpitas, CA (US)

( * ) Notice: Subject to any disclaimer, the term of this patent is extended or adjusted under 35 U.S.C. 154(b) by 0 days.

(21) Appl. No.: 11/834,013

(22) Filed: Aug. 6, 2007

Related U.S. Application Data

(60) Provisional application No. 60/821,570, filed on Aug. 6, 2006.

(51) Int. Cl.
*G01L 7/08* (2006.01)
*G01L 9/00* (2006.01)

(52) U.S. Cl. .................................................. 73/715
(58) Field of Classification Search .................... 73/700, 73/715, 756; 438/53
See application file for complete search history.

(56) References Cited

U.S. PATENT DOCUMENTS

| | | | |
|---|---|---|---|
| 6,341,528 B1 * | 1/2002 | Hoffman et al. | 73/777 |
| 6,651,506 B2 * | 11/2003 | Lee et al. | 73/718 |
| 6,874,367 B2 * | 4/2005 | Jakobsen | 73/718 |
| 7,111,518 B1 * | 9/2006 | Allen et al. | 73/715 |
| 2003/0100316 A1 * | 5/2003 | Odamura | 455/456 |
| 2008/0160659 A1 * | 7/2008 | Craddock et al. | 438/53 |

* cited by examiner

*Primary Examiner*—Andre J Allen
(74) *Attorney, Agent, or Firm*—Townsend and Townsend and Crew LLP; J. Matthew Zigmant

(57) ABSTRACT

Methods and apparatus for an absolute or gauge pressure sensor having a backside cavity with a substantially vertical interior sidewall. The backside cavity is formed using a DRIE etch or other MEMS micro-machining technique. The backside cavity has an opening that is cross shaped, where the dimensions of the cross may be varied to adjust pressure sensor sensitivity. The cross may have one or more rounded corners to reduce peak stress, for example, the interior corners may be rounded. A sensing conductor may be routed over one or more corners including the interior corners to detect breakage.

28 Claims, 7 Drawing Sheets

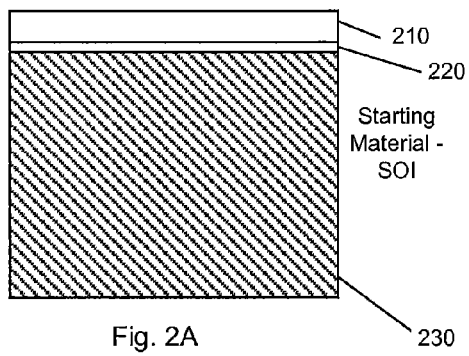
Fig. 2A — Starting Material - SOI
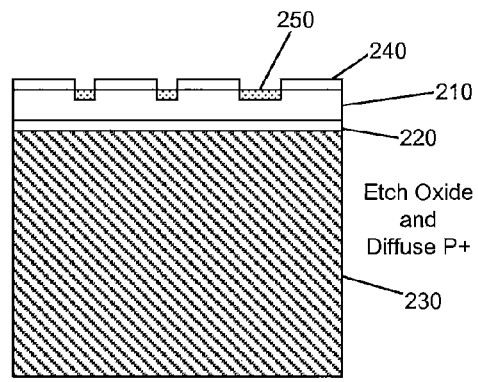
Fig. 2D — Etch Oxide and Diffuse P+
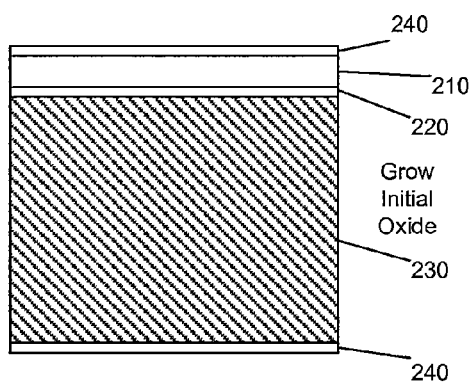
Fig. 2B — Grow Initial Oxide
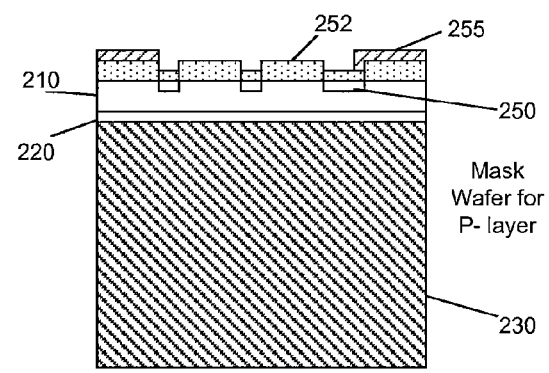
Fig. 2E — Mask Wafer for P- layer
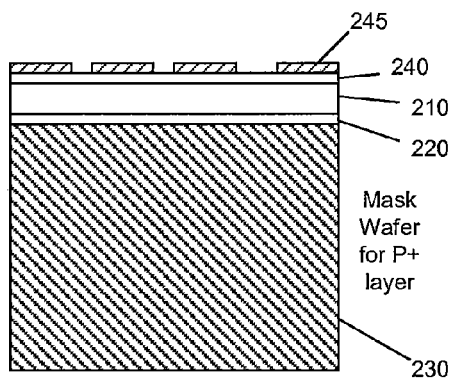
Fig. 2C — Mask Wafer for P+ layer
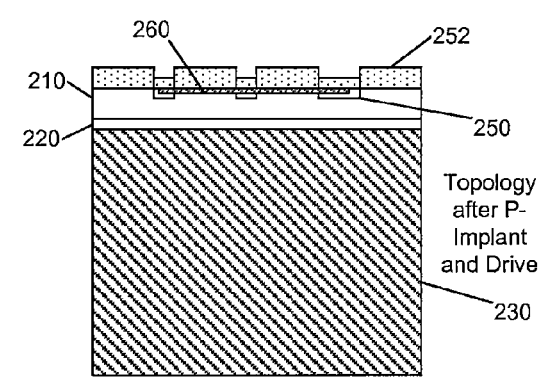
Fig. 2F — Topology after P- Implant and Drive

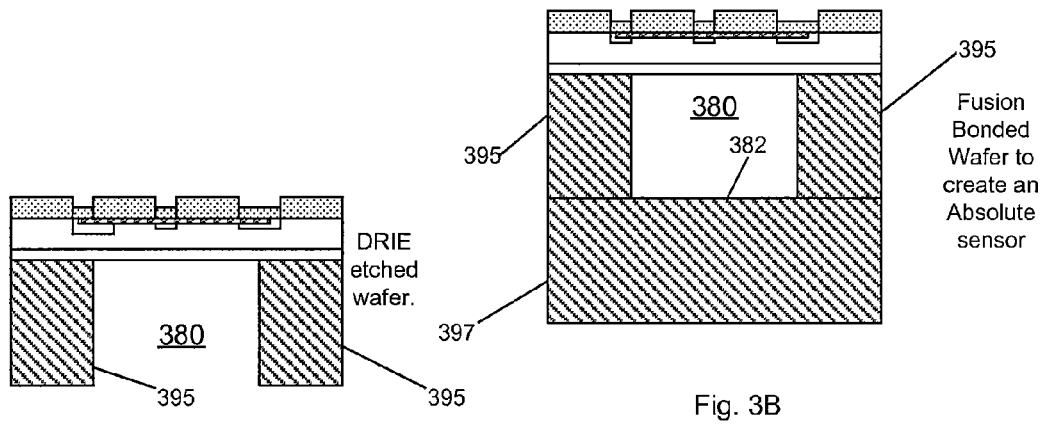
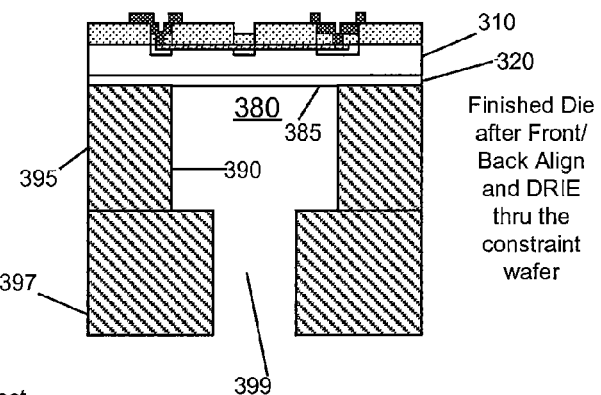
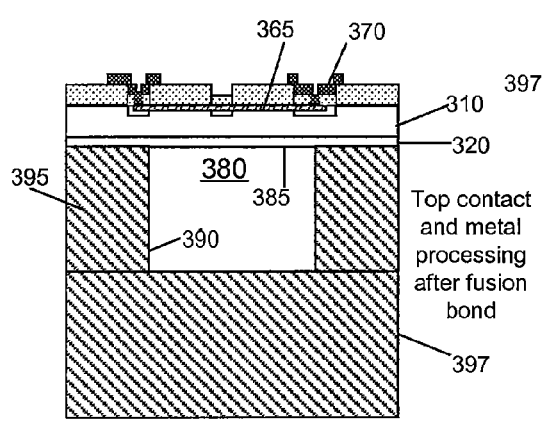
Fig. 3A
Fig. 3B
Fig. 3C
Fig. 3D

600

650

PRESSURE SENSOR ADJUSTMENT USING BACKSIDE MASK

This application claims the benefit of U.S. provisional application No. 60/821,570, filed Aug. 6, 2006, titled "Pressure Sensor Adjustment Using Backside Mask," by Henry V. Allen, which is incorporated by reference. This application is also related to U.S. patent application Ser. No. 10/665,991, titled "Extremely Low Cost Pressure Sensor Realized Using Deep Reactive Ion Etching," by Allen et al., filed Sep. 19, 2003, now U.S. Pat. No. 7,111,518, which is incorporated by reference.

BACKGROUND

The present invention relates to the field of silicon pressure sensors, specifically pressure sensors having a frame or sidewall having an inner side that is substantially orthogonal to a pressure sensor diaphragm and a backside opening having a cross shape.

Conventional pressure sensors include a diaphragm supported by a frame or sidewall. The frame or sidewall is typically made from the same silicon block as the diaphragm, and is formed by etching a backside cavity in the silicon block.

FIG. 1 A is a cross-section of a conventional pressure sensor 100 that may be improved by incorporation of embodiments of the present invention. This pressure sensor includes a diaphragm 110 supported by a frame 120. These sensors are conventionally fabricated by selectively etching a <100> silicon wafer using KOH. Specifically, a silicon wafer or block is etched most of the way through resulting in a backside cavity 130 having a backside opening 135.

The backside cavity 130 is defined by the backside opening 135 and an inner sidewall of the frame 120, which has a slope of 54.7 degrees as dictated by the <111> crystal plane. Accordingly, for each micron of depth 125 of the cavity 130, the backside opening 135 is increased by 0.708 microns in width. For example, a 10 microns thick, thousand micron wide diaphragm in a 410 microns thick silicon wafer requires an additional length 137 equal to 283 microns for a total backside opening 135 of 1566 microns. In practice, the actual die size is even larger. This is because the sidewalls require a certain width since these die are conventionally bonded to glass or other type substrate before the die in the wafer are individualized. This additional length 127 in one example is 255 microns. In that case, using the above numbers, the actual die length becomes 2076 microns. In another example, the diaphragm length may be reduced to 250 microns. In that case, the die length is reduced to 1326 microns.

As can be seen from FIG. 1A, a large part of the length of these sensors is due to the sloped edges of the frame 120. Accordingly, if the edge of the frame 120 is made substantially vertical, the overall die length is reduced. For example, if the diaphragm length is maintained at 250 microns and the sidewall width 127 is held at 255 microns, the die length is decreased from 1326 to 760 microns. Given a 0.1 mm line width required for dicing the wafer into individual die, this length reduction means 2.75 times the number of sensors may be fabricated on a wafer. Thus, what is needed are methods and apparatus for extremely low cost pressure sensors having a frame or sidewall that is substantially orthogonal to the sensor diaphragm. It is also desirable that the sensitivity of the pressure sensor be variable by changing a limited number of masks and processing steps.

SUMMARY

Accordingly, embodiments of the present invention provide a pressure sensor having a cross-shaped backside opening that provides a sensitivity that is variable using a limited number of masks and processing steps. The dimensions of the cross may be varied to adjust pressure sensor sensitivity. The cross may have one or more rounded corners to reduce peak stress, for example, the interior corners may be rounded. A sensing conductor may be routed over one or more corners including the interior corners to detect breakage.

The pressure sensor has substantially vertical frame sides that are orthogonal to a sensor diaphragm such that the pressure sensor die size is dramatically reduced. These sides, the interior sidewall of a backside cavity, are formed using a Deep Reactive Ion Etch (DRIE) or other Mirco-Electro-Mechanical System (MEMS) micro-machining technique.

Embodiments of the present invention may be used in a myriad of applications. Examples include portable electronic devices or consumer goods such as electronic watches, dive computers, and cell phones where the measurement of atmospheric pressure or water pressure is useful, test devices, and other such systems. Other examples include sensors for tire pressure. These tire pressure sensors may be fabricated on the same die as an acceleration sensor.

Methods that are in accordance with the present invention may be used to manufacture either absolute or gauge sensors. Specific embodiments result in 150 mm (6 inch) silicon wafers containing approximately at least 19,000 sensors, each with a diaphragm less than 350 microns in length, and having an area greater than 10 percent of the total sensor die area. Other embodiments provide 150 mm (6 inch) silicon wafers containing over 25,000 sensors, each with a diaphragm less than 250 microns in length, and also having an area greater than 10 percent of the total sensor die area. The resulting sensors may use piezoresistive or capacitive sensing circuits.

A pressure sensor according to the present invention may incorporate one or more of these, or may incorporate other elements discussed herein. A better understanding of the nature and advantages of the present invention may be gained with reference to the following detailed description and the accompanying drawings.

BRIEF DESCRIPTION OF THE DRAWINGS

FIG. 1 A is a cross-section of a conventional pressure sensor that may be improved by incorporation of embodiments of the present invention, while

FIGS. 2A-2F illustrate steps that may be followed in beginning the manufacturing a pressure sensor consistent with an embodiment of the present invention, while

FIGS. 3A-3D illustrate steps that may be followed in manufacturing either an absolute or gauge sensor in accordance with an embodiment of the present invention;

DESCRIPTION OF EXEMPLARY EMBODIMENTS

Figure 1A:
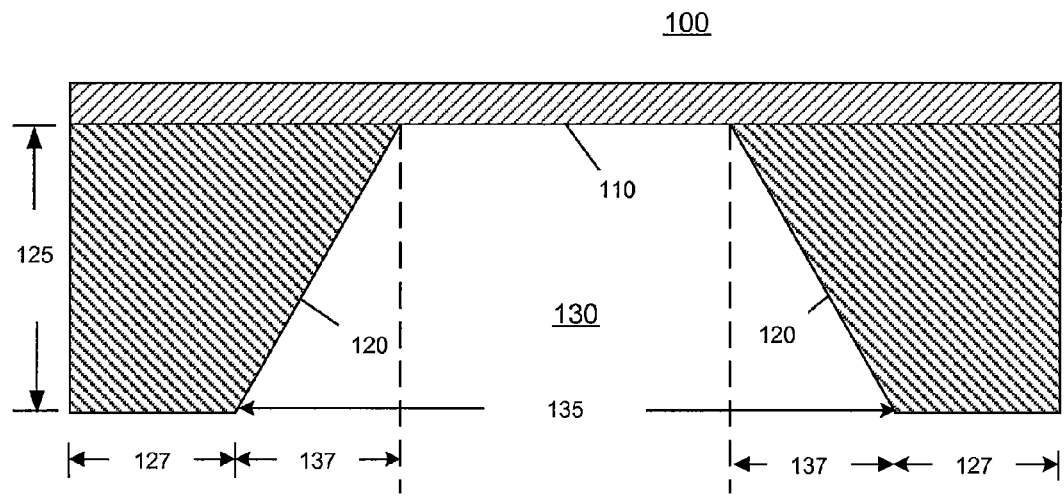
Figure 1B:
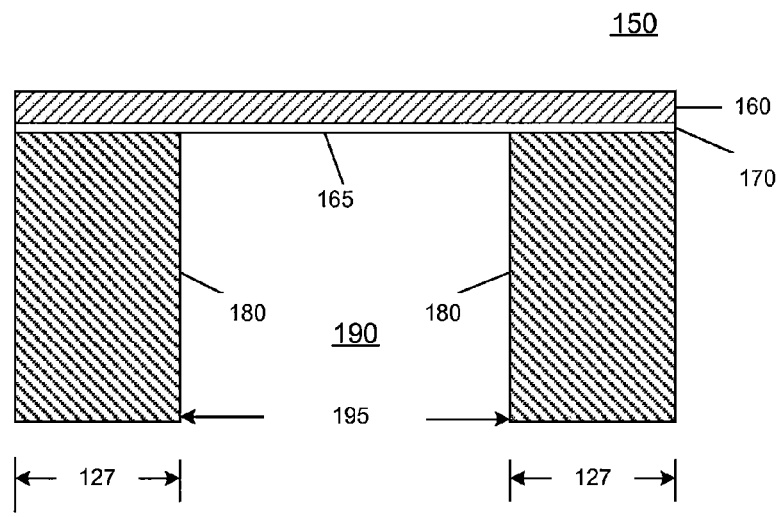
FIG. 1B is a cross-section of a pressure sensor in accordance with an embodiment of the present invention.

FIG. 1B is a cross-section of a pressure sensor in accordance with and embodiment of the present invention. This pressure sensor includes a diaphragm 165 supported by a frame 180. This figure, as with all the included figures, is shown for explanatory purposes only, and does not limit either the claims or the possible embodiments of the present invention.

As can be seen, the walls of the frame 180 are substantially vertical. In a specific embodiment of the present invention, the interior wall of the backside cavity 190, that is, the interior wall of the frame 180, is made vertical by etching the backside cavity 190 using a deep reactive ion etch (DRIE) process. In other embodiments, other MEMS micro-machining techniques are used, for example, Ion Milling. Alternately, other silicon etches that provide substantially vertical sidewalls may be used. The term DRIE as used herein refers to Deep Ion Etching with high aspect ratio etch characteristics that provide substantially vertical walls. For example, these walls may be within 1 to 3 degrees of vertical depending on the speed of the etch and the exact equipment and etch parameters such as gas mix. Alternately, the walls may be more than 3 degrees from vertical, or less than one degree from vertical, again depending on the above factors. Manufactures that provide plasma processing equipment that may be used include Surface Technology Systems located in Great Britain, Alcatel located in France, and Applied Materials located in California. The outer wall of the frame 180 is typically made vertical by sawing the wafer in order to separate individual die or pressure sensors from one another.

Using a deep reactive ion etch to form a vertical interior wall of the backside cavity 190 has at least two problems. The first problem is the control of the thickness of the diaphragm 165. The DRIE process etches near vertical walls at a rate that is typically between three microns per minute to currently as high as 20 microns per minute. The uniformity of this etch is typically plus or minus 5 percent. When applied to a 410 micron thick wafer where the desired diaphragm thickness is 10 microns, this tolerance leads to a 300 percent variation in diaphragm thickness.

To solve this, a specific embodiment of the present invention employees an insulator layer 170 between a first silicon layer 160 and a second silicon layer which forms the frame 180. As the DRIE process etches the backside cavity 190, the etching slows dramatically when the insulator layer 170 is reached. Thus, after DRIE etching, each diaphragm on a wafer has a thickness that is approximately equal to the thickness of the first silicon layer 160 and insulator layer 170.

The second problem associated with DRIE etching is its cost. Accordingly, an embodiment of the present invention provides a small enough die such that the X-Y array of sensors on a wafer is dense enough that the use of the DRIE process becomes cost effective.

In a specific embodiment of the present invention, the length of the diaphragm is less than 350 microns, and it accounts for more than 10 percent of the total die area. This efficient use of die area helps make the manufacture of these sensors cost effective at a wafer level.

Figure 2G:
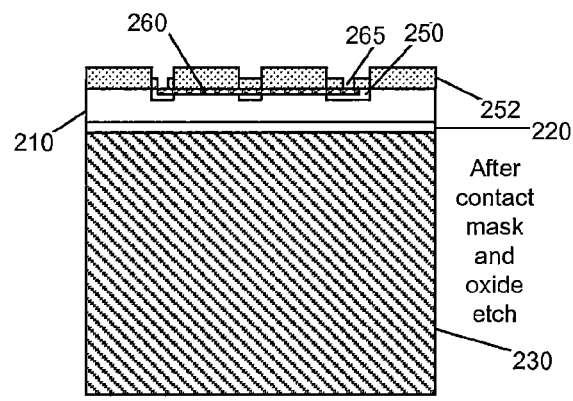
FIGS. 2G-2J illustrate the steps that may be followed in completing the manufacturing of a pressure sensor in accordance with an embodiment of the present invention.

FIGS. 2A-2J illustrate steps that may be followed in manufacturing a pressure sensor 200 consistent with an embodiment of the present invention. In FIG. 2A, a silicon-on-insulator starting material is provided. This material includes an insulator layer 220 sandwiched between a first silicon layer 210 and a second silicon layer 230. One embodiment of the present invention uses starting material where the first silicon layer 210 is approximately between 5 to 9 microns thick. The first silicon layer 210 may be as thick as 15 microns for a "150 PSI" part, or thicker than 15 microns for higher pressures. This starting material also has an insulator layer 220 made of silicon dioxide that is approximately 2500 Angstroms thick, and a second silicon layer 230 that is approximately 400 microns thick. Both sides of the starting material are optically polished. In FIG. 2B, an oxide layer 240 is grown on the top and bottom surfaces of the wafer. In FIG. 2C a resist layer 245 is deposited on the wafer and patterned. In FIG. 2D, the oxide is etched and p+ regions 250 are diffused into the first silicon layer 210. Again, a resist layer 255 is deposited on the wafer and etched to form opening 252 in FIG. 2E.

In FIG. 2F, p− regions 260 are implanted through the oxide into the first silicon layer 210. The p+ 250 and p− 260 regions form piezoresistive sensing resistors that may be configured as a Wheatstone bridge or other configuration in order to generate a signal that is proportional to differential pressure across the diaphragm. Alternately, the resistors may be eliminated, and a cap may be placed over the diaphragm. First and second electrodes are then placed on the diaphragm and inside portion of the cap. As the diaphragm is deflected due to an applied pressure, the distance, and thus the capacitance between the electrodes changes.

Figure 2H:
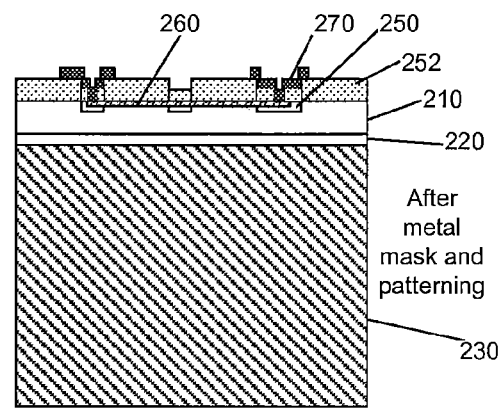
Figure 2I:
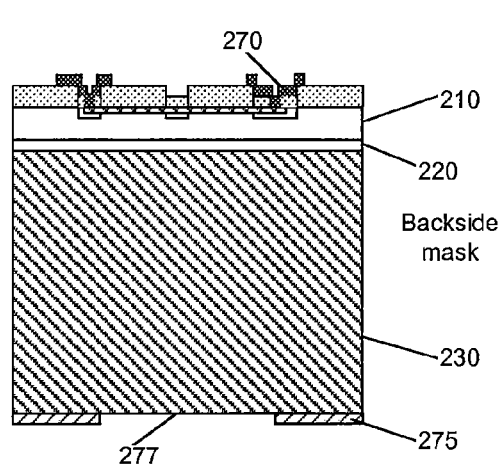
Figure 2J:
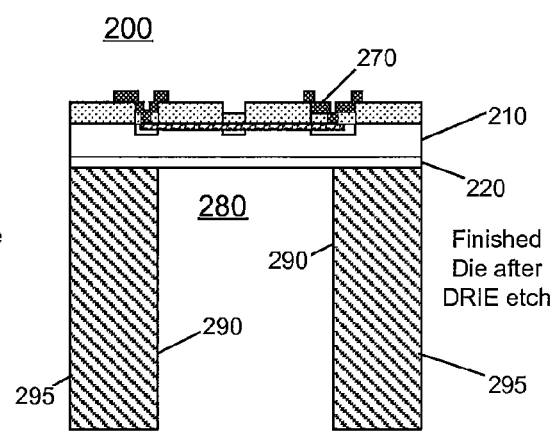

In FIG. 2G, a contact mask is used open areas for contacts 265. Metal 270 is deposited and etched as shown in FIG. 2H. In FIG. 2I, a backside mask is aligned using front-to-back alignment, such as by using infrared light, and the backside oxide 275 is selectively etched or patterned to form opening 277, which is an exposed silicon or no (or little) oxide area. In FIG. 2J, DRIE processing is used to etch through the second silicon layer from the opening in the oxide 277 to the insulator layer 220. In this way, the backside cavity 280 surrounded by substantially vertical—that is, orthogonal to the diaphragm— interior wall 290 of frame 295 is formed.

At this point the sensitivity of the sensor may be adjusted. For example, the insulating layer 220, which may be referred to as a buried insulating layer, above the cavity 280 may be thinned. Further adjustment may be made by removing this portion of the insulating layer. Even further adjustment may be made by thinning the resulting diaphragm, which at this point is made primarily of the first silicon layer 210.

FIGS. 3A-3D illustrate steps that may be followed in manufacturing either an absolute or gauge sensor in accordance with an embodiment of the present invention. To make the structure shown in FIG. 3A, the steps illustrated in FIGS. 2A-2F have been followed. Additionally, an oxide has been grown on the backside of the wafer, the oxide etched, and DRIE etching has been used to remove silicon to form the backside cavity 380.

In FIG. 3B, a second silicon wafer, glass, or other block 397 is attached to the bottom of the pressure sensor 300. In a specific embodiment, a second silicon wafer is attached to the bottom of the silicon wafer containing a number of sensors. For example, there may be 20,000 or more sensors on a 6 inch wafer. The second silicon wafer may be referred to as a constraint wafer. The frame 395 and block 397 may be fusion bonded, or otherwise affixed, such that a hermetic seal around backside cavity 380 is formed. In FIG. 3C, metal 370 has been deposited and patterned forming contacts for the resistors 365. At this time, the sensors may be separated, for instance by sawing, resulting in a number of absolute sensors.

If the sensors are individualized at this point, the result is an absolute pressure sensor having a diaphragm 385 supported by a frame 395. The frame 395 wraps around a backside cavity 380 having an interior sidewall 390. This interior sidewall 390 is substantially vertical or orthogonal to the diaphragm 385. The diaphragm 385 is formed by a first silicon layer 310 and insulator layer 320, while the frame 395 is formed from an etched second silicon layer. The frame is also attached to a block 397.

This structure may be further processed in order to make a gauge sensor. For example, in FIG. 3D, an oxide layer is grown on the bottom of the second wafer 397, the oxide layer is patterned and etched, and DRIE etch processing is used to open a hole 399 through the second wafer 397. In this case, the insulator layer 320 blocks the DRIE etch after the hole 399 is opened in the second silicon wafer 397.

These sensors may be individualized at this point. The result is a gauge wafer having a diaphragm 385 supported by frame 395. The frame wraps around a backside cavity 380 having an interior sidewall 390. The interior sidewall 390 is substantially vertical or orthogonal to the diaphragm 385. The diaphragm 385 is formed by a first silicon layer 310 and insulator layer 320, while the frame 395 is formed from an etched second silicon layer. The frame is also attached to a block 397, which has a hole 399 leading to the backside cavity 380. The hole 399, like the backside cavity 380, typically has a substantially vertical inner wall, that is, a wall that is substantially vertical to the diaphragm.

The use of block 397 isolates the die from the environment that is being measured. Also, the hole 399 can be smaller than the opening 382 to the backside cavity 380. This provides important advantages over mechanical ultrasonic drilling in that the cost of drilling holes over a large array becomes prohibitive and is limited in size to approximately between 300 and 500 microns. Block 397 also provides mechanical support to the sensor structure.

FIGS. 4A-4D illustrate patterns that may be used in etching a backside cavity. These patterns are used to form the areas where oxide is removed, such as 277 in FIG. 2, before a DRIE etch is performed. These shapes thus dictate the shape of the backside opening, cavity, interior wall, and diaphragm.

Figure 4A:
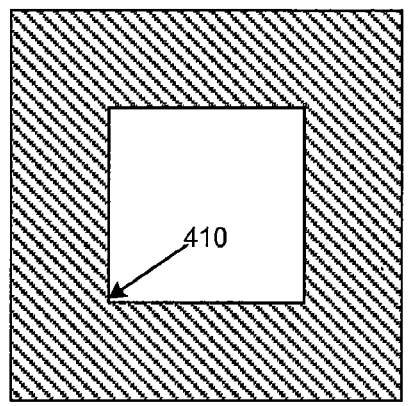
FIGS. 4A-4D illustrate patterns that may be used in etching a backside cavity.

FIG. 4A illustrates a conventional square back-etch pattern that may be used for the shape of a backside opening and cavity. One drawback of this shape is that structural cracks or breaks may form approximately along line 410, since physical stress tends to accumulate in the corners of the square.

Figure 4B:
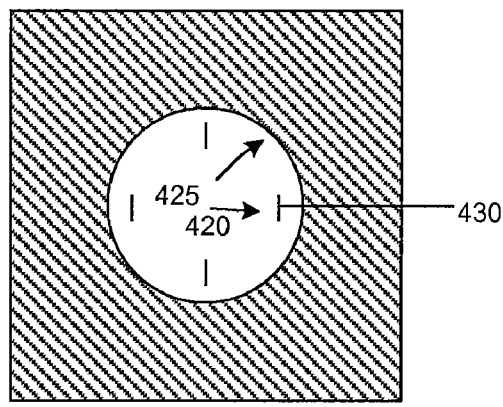

FIG. 4B illustrates a circular backside opening and cavity. Here, stress is evenly distributed in all directions along lines 420 and 425. Accordingly, this structure reduces the cracking associated with the square pattern of FIG. 4A. However, since the piezoresistive elements tend to be placed in positions such as 430, the stress lines 425 between them do not contribute to a pressure sensing output signal. Accordingly, the gain of the sensor, that is the change in resistance as a function of change in pressure, is reduced for the circular diaphragm as compared to the square.

Figure 4C:
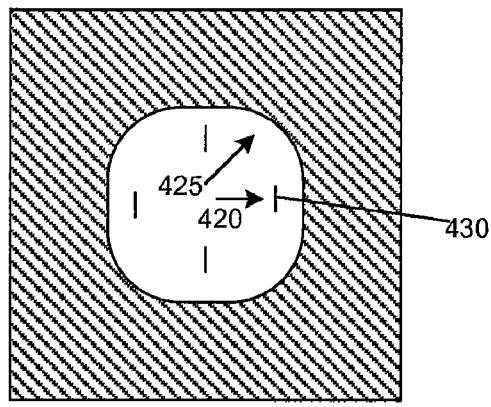

FIG. 4C illustrates a compromise between the square of FIG. 4A and circle of FIG. 4B. This shape may be referred to as a rounded square. Alternately, the width and length of the pattern may be different, resulting in a rounded-rectangular shape. Here, the strongest stress lines 420 are applied in the direction of the resistors 430, while the stress along lines 425 between the resistors is reduced. A specific embodiment of the present invention uses a rounded shape where each rounded corner accounts for approximately 25 percent of the edge. In other embodiments, this may be more pronounced, for example, at least 25 percent of the edge may be used by each curve, or at least 33 percent of the edge may be used by each curve.

This shape has a further advantage in that the sensors are shipped in packaging tape and are removed from this packaging tape by pushpins. This removal is made easier by the larger silicon area of FIG. 4C as compared to the square backside cavity and opening of FIG. 4A. This shape also provides additional space for topside bond pads as compared to the square backside.

Figure 4D:
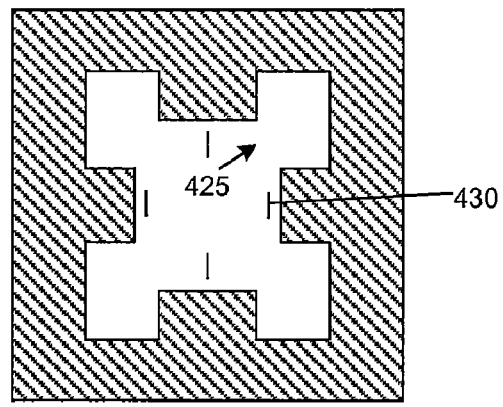

FIG. 4D illustrates a castle shape that may be used to as an alternate back etch pattern according to an embodiment of the present invention. This shape results in a further reduction in the amount of stress along lines 425 between resistors 430. Other examples can be found in U.S. Pat. No. 6,089,099, titled "Method for Forming a Bonded Silicon-Glass Pressure Sensor With Strengthened Corners," by Sathe, which is incorporated by reference.

Another shape that may be used for the backside opening is shown in the following figures. This shape is referred to as a cross shape. By varying the width of the cross, the sensitivity of the pressure sensor can be varied. Specifically, if the cross is made narrower, the sensitivity is reduced and the sensor becomes progressively more suitable for measuring higher pressures. This shape is particularly advantageous when combined with DRIE etching, as the size and width of the cross can be precisely formed.

Figure 5A:
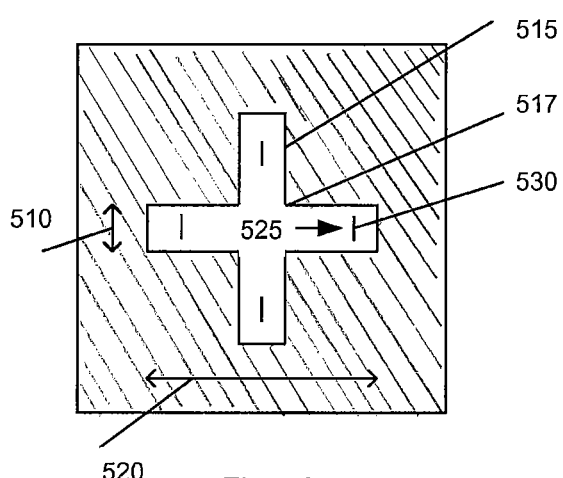
FIGS. 5A-5C illustrates a cross-shaped pattern that may be used in etching a backside cavity consistent with an embodiment of the present invention.
Figure 5B:
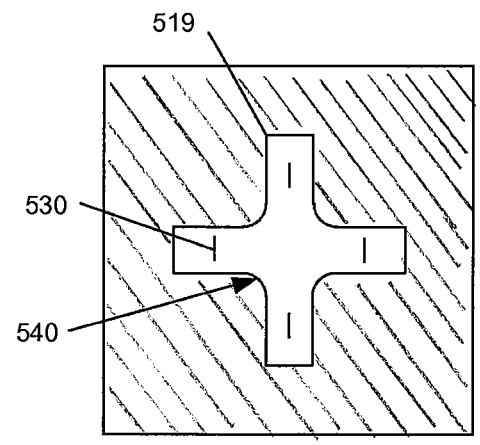
Figure 5C:
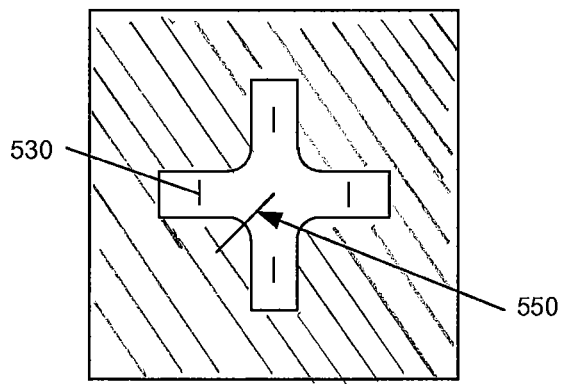

FIGS. 5A-5C illustrates a cross-shaped pattern that may be used in etching a backside cavity. As before, this pattern is used to form the areas where oxide is removed, such as 277 in FIG. 2, before a DRIE etch is performed. This shape again dictates the shape of the backside opening, cavity, interior wall, and diaphragm.

FIG. 5A illustrates a pressure sensor having a cross-shaped backside opening consistent with an embodiment of the present invention. This cross shape has a width 510 and a length 520. While in this example, the cross shape is symmetrical, in other embodiments of the present invention, the cross shape may be asymmetrical. For example, one or more of the four arms 515 may have a length or a width that is different from one or more of the other arms. Also, in various embodiments of the present invention, one or more of the arms may be eliminated, or additional arms may be added.

As before, this backside-opening shape reduces stress along line 525. Four piezoresistive elements are shown as being placed along this and the three other corresponding lines, specifically in position 530. In other embodiments of the present invention, there may be more or fewer elements and they may be placed in different locations. For example, the elements may be placed on a location not above the backside opening, or they may straddle the backside opening. Also, elements may be placed at more than one of these or other appropriate locations.

This shape provides for the adjustment of pressure sensor sensitivity using a limited number of masks and manufacturing steps. For example, a specific embodiment of the present invention provides a cross-shape backside opening having a width that can be varied in order to reduce or increase pressure sensor sensitivity by changing only one mask. Specifically, when a mask having a narrow width 510 is used, the sensitivity is reduced, and the sensor becomes more suitable for measuring higher pressures. Conversely, when a mask having a wider width 510 is used, the cross degenerates towards a square having a higher sensitivity. In other embodiments of the present invention, the length 520 may be varied, while in others, the width and length may be varied to change pressure sensor sensitivity. For example, the length of one or more cross arms may be varied such that elements 530 are moved on or off the diaphragm defined by the cross shape. Changing sensor sensitivity with a single back mask provides an advantage since fewer thicknesses of starting material needs to be inventoried to provide a range of pressure sensor sensitivity.

Specifically, a manufacturer may stock a number of masks, each mask having a cross shape (actually, a number of cross shapes, one for each die in a reticle) having a different width. A desired sensor sensitivity can be determined, for example, by customer input, marketing, applications, designers, or others. A corresponding mask can then be selected and used to manufacture a number of pressure sensors.

In various embodiments of the present invention, the width and length of the cross many have different dimensions. In a specific embodiment of the present invention, the cross has a width 510 of 75 microns and a length 520 of 250 microns. This allows an inventory of 5 micron SOI material to be used in the manufacture of 15, 30, 60, and 100 PSI pressure sensors. In other embodiments of the present invention, other widths and lengths may be used along with other thicknesses of materials to achieve different sensitivity pressure sensors. Typically, a mask reticle has a backside pattern for a number of pressure sensors on a wafer. While these may all be the same size, in other embodiments of the present invention, some or all of these backside patterns have a different cross size or width. This provides a range of pressure sensitivities for each manufactured wafer.

With this shape, the highest stress lines are at the four interior corners 517. Accordingly, various embodiments of the present invention round these corners, or otherwise remove its sharp point, to reduce the stress. This lowers the incidence of breakage for the pressure sensors.

FIG. 5B illustrates a pressure sensor backside opening having a cross shape with rounded interior corners. Specifically, interior corners 540 are rounded such that stress lines are reduced at these points. In other embodiments of the present invention, other corners, such as the exterior corners 519, may likewise be rounded. Also, in other embodiments of the present invention, these corners are not rounded but instead are cut-off such that a 45° angle is approximately formed. For example, the rounding of corner 540 can be approximated using a straight line.

In order to detect the incidence of breakage at one or more of these corners, a conductor may be placed on the diaphragm above a corner of the backside opening. FIG. 5C illustrates a cross-shaped backside opening having a conductor 550 over an interior corner. While the corner is shown as being rounded in this example, in other embodiments of the present invention, the conductor is placed over a corner that is not rounded, such as in FIG. 5A. Other conductors may be used over other corners as well, for example, a conductor may be placed over an exterior corner.

Figure 6A:
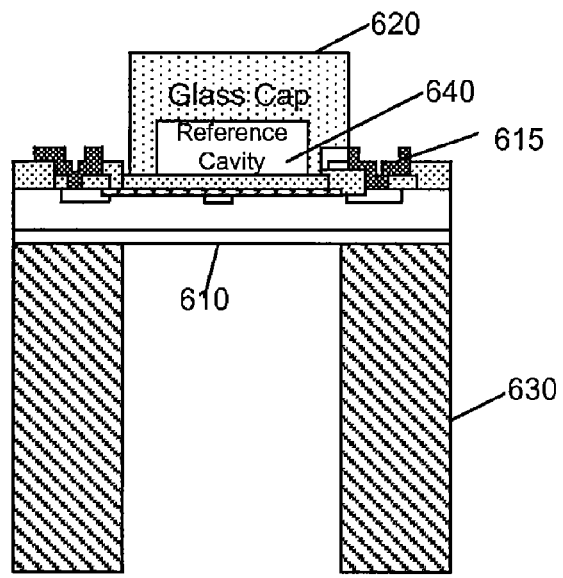
FIGS. 6A and 6B illustrate backside absolute pressure sensors in accordance with an embodiment of the present invention.
Figure 6B:
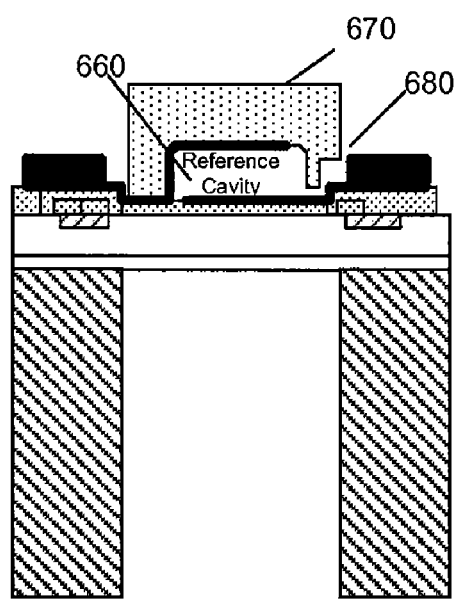

FIGS. 6A and 6B illustrate backside absolute pressure sensors in accordance with an embodiment of the present invention. In FIG. 6A, pressure sensor 600 includes a diaphragm 610 supported by frame 630 and covered by cap 620. This cap 620 creates a reference cavity 640. In this way an absolute reference cavity is formed at the top side of the diaphragm. This is useful, for example, in harsh environments.

In a specific embodiment, the cap is formed of glass and is sealed forming a reference cavity 640 by anodic bonding of the glass to either silicon or silicon oxide. Alternately, fusion bonding may also be done using a thin silicon cap with the cap recessed in the cavity slightly larger than the diaphragm. In a specific embodiment, the pads 615 are exposed by dicing through the glass. The reference cavity is typically 5 to 15 microns in depth.

FIG. 6B illustrates a sensor 650 having a topside vented cavity 660 formed by anodic bonding of a glass cap 670 to either silicon or silicon oxide. This sensor is a capacitive sensor, where the reference cavity is typically between 1 and 3 microns in depth. In the pressure sensor shown, an optional vent 680 is included. In other embodiments, the reference cavity 660 may be hermetically sealed.

Since embodiments of the present invention result in pressure sensors that are small in size, they are particularly well-suited for use in systems where component space or weight is limited. One such system is a tire pressure monitor system (TPMS) which is mounted to the rim or valve stem of a vehicle tire and wirelessly sends data regarding the pressure within the tire to an electronic control unit affixed to the body of the vehicle. In such a system, the pressure sensor die may be mounted in a molded plastic package to facilitate its mechanical and electrical connection to the system and protect the pressure sensor die from the environment within the tire.

In another embodiment of the present invention in a TPMS application, the pressure sensor is combined with an acceleration sensing device that is used to detect the rotation of the tire. The pressure sensor may be fabricated on the same silicon chip as the acceleration sensor in order to reduce the overall size of the packaged acceleration and pressure sensor combination.

Embodiments of the present invention are also particularly well-suited for use portable electronic devices where space for electronic components is at a premium. Examples of such systems include electronic watches, dive computers and cell phones where the measurement of atmospheric pressure or water pressure is useful.

The foregoing description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A pressure sensor comprising:
   a diaphragm and a sidewall, the sidewall having an interior side defining a backside cavity, the backside cavity extending from a portion of an insulator layer directly in contact with the diaphragm to a backside opening,
   wherein the interior side of the sidewall is formed using a deep reactive ion etch and is substantially orthogonal to the diaphragm,
   wherein the deep reactive ion etch begins at the backside opening and etches towards the diaphragm at a rate that is substantially reduced when the insulator layer is reached, and
   wherein the backside opening forms a cross shape.

2. The pressure sensor of claim 1 wherein the interior corners of the cross are rounded.

3. The pressure sensor of claim 1 further comprising:
   a conductor over at least one of the interior corners of the cross.

4. The pressure sensor of claim 1 further comprising:
   a conductor over an interior corner of the cross,
   wherein the interior corners of the cross are rounded.

5. The pressure sensor of claim 1 further comprising:
a block covering the backside opening such that a hermetic seal is formed.

6. The pressure sensor of claim 5 wherein the block is silicon.

7. The pressure sensor of claim 5 wherein the block is glass.

8. The pressure sensor of claim 7 wherein the glass block is covered with metal over the backside opening.

9. The pressure sensor of claim 1 wherein the pressure sensor is included in a tire pressure monitor system.

10. The pressure sensor of claim 1 wherein the pressure sensor is included in an electronic system selected from the group consisting of an electronic watch, a dive computer, and a cell phone.

11. A pressure sensor comprising:
a first silicon layer comprising a diaphragm;
an insulator layer below the first silicon layer;
a second silicon layer below the insulator layer and having a backside cavity defined by a sidewall, a backside opening, and a portion of the insulator layer below and directly in contact with the diaphragm,
wherein the backside cavity is formed using a deep reactive ion etch and the sidewall is substantially orthogonal to the diaphragm,
wherein the backside opening forms a cross shape.

12. The pressure sensor of claim 11 wherein the interior corners of the cross are rounded.

13. The pressure sensor of claim 11 further comprising:
a conductor over at least one of the interior corners of the cross.

14. The pressure sensor of claim 11 further comprising:
a conductor over an interior corner of the cross,
wherein the interior corners of the cross are rounded.

15. The pressure sensor of claim 11 further comprising:
a block covering the backside opening such that a hermetic seal is formed.

16. The pressure sensor of claim 15 wherein the block is silicon.

17. The pressure sensor of claim 15 wherein the block is glass.

18. The pressure sensor of claim 17 wherein the glass block is covered with metal over the backside opening.

19. The pressure sensor of claim 11 wherein the pressure sensor is included in a tire pressure monitor system.

20. The pressure sensor of claim 19 wherein the tire pressure monitor wirelessly transmits pressure data.

21. The pressure sensor of claim 19 wherein the pressure sensor is fabricated on the same silicon chip as an acceleration sensor.

22. The pressure sensor of claim 11 wherein the pressure sensor is included in an electronic system selected from the group consisting of an electronic watch, a dive computer, and a cell phone.

23. A pressure sensor comprising:
a first silicon layer having a top side and a bottom side and comprising a diaphragm;
an insulator layer having a top side and a bottom side, the top side in contact with the bottom side of the first silicon layer;
a second silicon layer having a top side and a bottom side, the top side in contact with the bottom side of the insulator layer and having a backside cavity defined by a sidewall, a portion of the bottom side of the insulator layer, and a backside opening in the bottom side of the second silicon layer,
wherein the backside cavity is formed using a deep reactive ion etch and the sidewall is substantially orthogonal to the diaphragm,
wherein the backside opening forms a cross shape.

24. The pressure sensor of claim 23 wherein the interior corners of the cross are rounded.

25. The pressure sensor of claim 23 further comprising:
a conductor over at least one of the interior corners of the cross.

26. The pressure sensor of claim 23 further comprising:
a conductor over an interior corner of the cross,
wherein the interior corners of the cross are rounded.

27. The pressure sensor of claim 23 wherein the pressure sensor is included in a tire pressure monitor system.

28. The pressure sensor of claim 23 wherein the pressure sensor is included in an electronic system selected from the group consisting of an electronic watch, a dive computer, and a cell phone.

* * * * *